Oct. 31, 1939.     W. WOGECK     2,178,293
MEASURING DEVICE
Filed Dec. 1, 1938     2 Sheets-Sheet 1
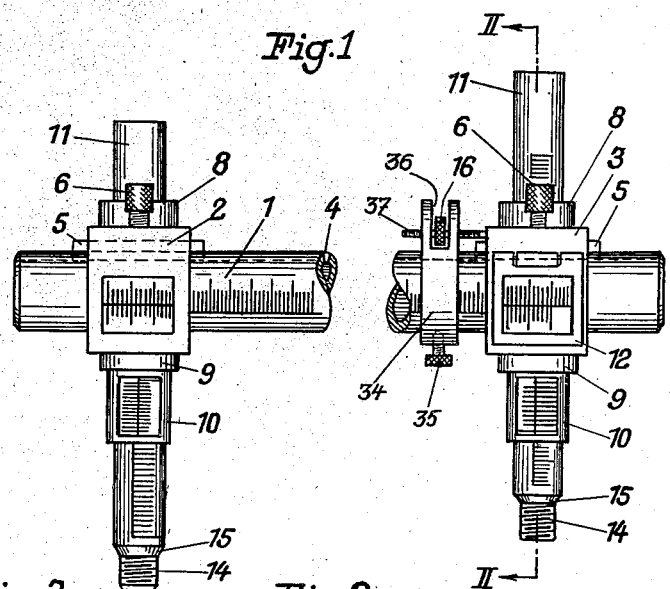
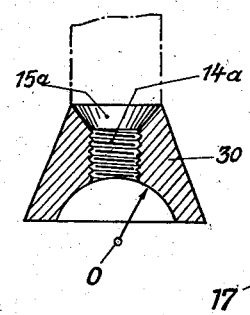
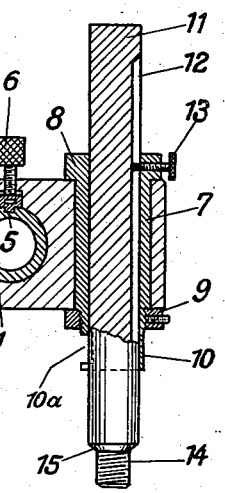
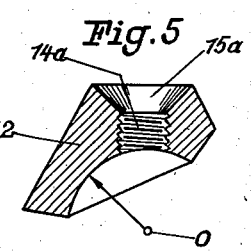
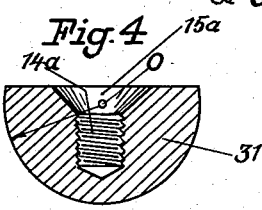
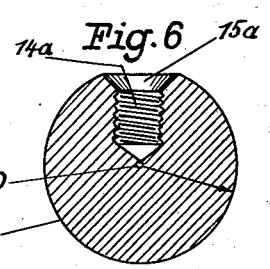
Inventor:
Walter Wogeck
by Gerald Baldwin
Attorney.

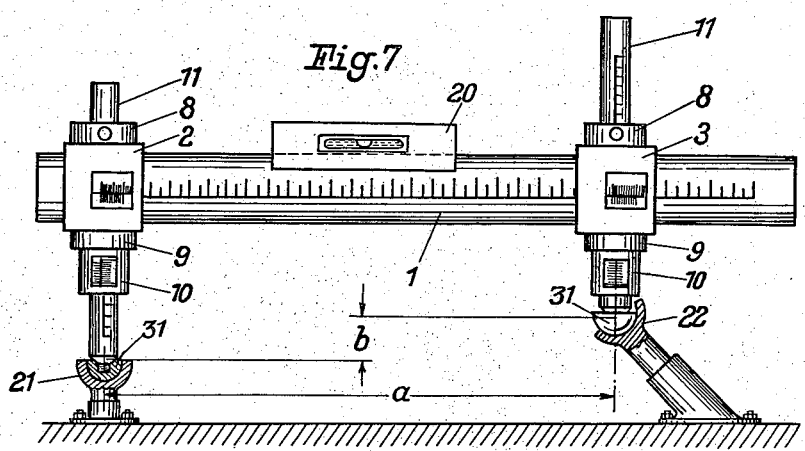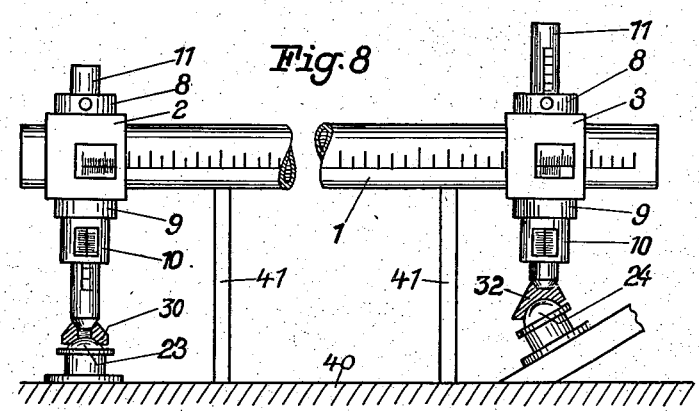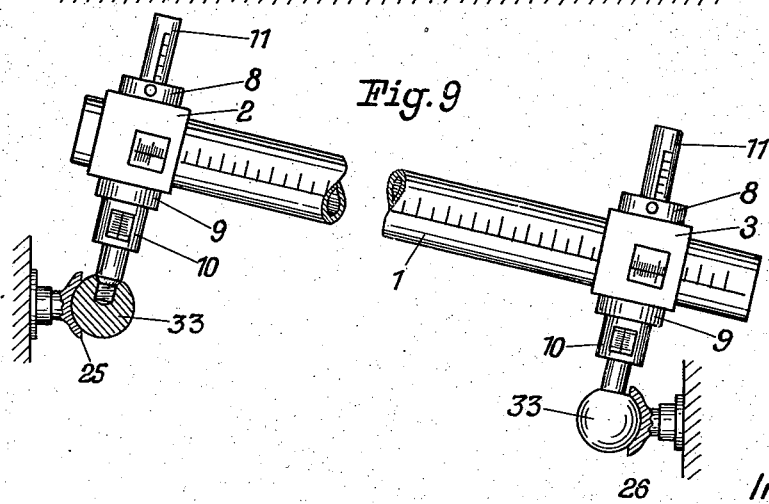

Patented Oct. 31, 1939

2,178,293

UNITED STATES PATENT OFFICE 2,178,293

MEASURING DEVICE

Walter Wogeck, Waldersee, near Dessau, Germany, assignor to Junkers Flugzeug-und-Motorenwerke Aktiengesellschaft Application December 1, 1938, Serial No. 243,367
In Germany December 3, 1937

5 Claims. (Cl. 33—158)

This invention relates to improvements in measuring devices, and refers primarily to such devices for measuring the distance, usually in two directions at right angles to one another, between two points which are not directly measurable, and do not lie in the same plane.

It is a common practice in such work to utilize a longitudinal scale having two slides mounted thereon the spacing of which may be varied, and to employ interchangeable extension pieces of various lengths upon the slides. This, however, is a slow and tedious method due to the constant necessity for inserting, removing or substituting other extension pieces of different lengths each time any marked difference occurs in the distance of the points being measured from the longitudinal scale.

It is an object of the invention to provide a measuring device wherein slides mounted upon the longitudinal scale have lateral scales mounted therein for axial movement in order to obviate the necessity for using interchangeable extension pieces, and so that the one set of lateral scales may be utilized for measuring vastly different distances of the work from the longitudinal scale.

Another object of the invention is to provide a measuring device wherein bushings are provided in the scales, usually at right angles to the longitudinal scale, through which the lateral scales are mounted for axial movement to insure the maintenance of the desired angle, usually a right angle, between the longitudinal and the lateral scales.

Yet another object of the invention is to provide such a measuring device wherein the bushings are mounted for rotary movement in their slides, and wherein means are provided for preventing axial movement of the lateral scales in their bushings so that the bushings and their scales may be rotated as a unit in their slides.

Having thus briefly stated some of the objects and advantages of the invention I will now proceed to describe it in detail with the aid of the accompanying drawings, in which:

Figure 1 illustrates a front elevation of the invention.

Figure 2 is a section on the line II—II of Figure 1.

Figures 3 to 6 illustrate some of the attachments which may be utilized in conjunction with the device.

Figures 7 to 9 are diagrammatic views showing some applications of the invention.

Referring to the drawings, 1 designates a longitudinal scale which, in the present instance, is of circular, tubular cross section. Any desired graduations are marked longitudinally along the scale periphery.

Upon the scale 1 are two slides 2 and 3 either or both of which are mounted for axial movement thereon; in the present instance both slides are intended for movement. Formed longitudinally in the periphery of the scale 1 is a keyway 4 to receive keys 5, one of which is arranged in each slide 2 and 3, to retain the latter in alignment with one another. Extending through each slide 2 and 3 and in threaded engagement therewith is a set screw 6 which also engages one of the keys 5 so that by tightening the screws the slides may be held immovable upon the scale 1.

Since both the slides are identical I will now describe one of them. Extending through the slide 3 is a bushing 7, preferably disposed at right angles to the longitudinal scale 1. The bushing 7 has a flange 8 at one extremity which bears against one side of the slide 3, and the opposite extremity of the bushing is threaded to receive a nut 9 which bears against the opposite side of the said slide. Thus the bushing is held axially but is permitted rotary movement. Axially movable through the bushing 7 is a lateral scale 11, also of circular cross section, having graduations thereon; and carried by a sleeve 10 projecting from the bushing 7 is a vernier scale 10a which cooperates with the graduations upon the lateral scale 11. The latter also has a longitudinal keyway 12 formed in its periphery, and in threaded engagement with the bushing 7 and extending therethrough is a set screw 13 the inner extremity of which engages the keyway so that by tightening the said screw the lateral scale may be held immovable in the bushing 7. Thus, when desired, the bushing and lateral scale may be turned as a unit in the slide 3 without fear of disturbing the setting of the scale. One extremity of the lateral scale 11, which is of reduced diameter, is threaded at 14, and between this threaded portion and the body of the lateral scale an annular tapered shoulder 15 is formed. This threaded extremity 14 is for attachment to any of the threaded bores 14a formed in any one of the attachments 30, 31, 32 or 33 shown in Figures 3, 4, 5 and 6 respectively, and the annular tapered shoulder 15 is intended to bear against any one of the annular locating seats 15a formed in the said attachments.

The attachments 30 and 32 shown in Figures 3 and 5 are for use when measuring the distance between centers of balls or at least partly spherical objects, and the attachments 31 and 33 shown in Figures 4 and 6 respectively are for use when measuring the distance between the centers of spherical or partly spherical sockets. In each case the cipher 0 denotes the center of the ball or socket forming part of the attachment, from these centers the shoulders 15a must be space a predetermined distance.

Carried by the slide 3 upon its face 3a a vernier scale is provided to cooperate with the graduations upon the longitudinal scale 1. To facilitate the reading of this vernier setting a magnifying glass 17 may be suitably mounted upon the scale 3.

In order to facilitate exact setting of the slide 3 upon the longitudinal scale 1 a collar 34 is slidably mounted upon the latter. Extending radially through the collar 34 is a screw 35 to engage the periphery of the scale 1 and hold the said collar immovable. A portion of this collar is radially slotted at 36, and extending from the slide 3 parallel with the scale 1 is a stud 37 which projects through openings formed in the slotted collar portions. A nut 16 is in threaded engagement with the stud 37 between the said slotted collar portions, so that by rotation of this nut slight axial adjustment of the slide 3 upon the longitudinal scale 1 may be obtained.

In Figures 7 to 9 a few applications of the invention are shown wherein the attachments illustrated in Figures 3 to 6 are employed. It is however understood that the device may be employed for measuring the distance between a wide range of different parts for which still other attachments (not shown) must be utilized.

In Figure 7 the device is used to determine the longitudinal distance $a$ and the vertical distance $b$ of the centers of the sockets 21 and 22 from one another. In this case attachments 31 as shown in Figure 4 are mounted upon the threaded extremities 14 of both lateral scales 11. The slide 2 is moved to its zero position on the longitudinal scale 1, and the lateral scale 11 in the slide 3 is also set at its zero position in its bushing 7. A spirit level 20 is then placed upon the longitudinal scale 1 and the slide 3 is moved along the latter, and the lateral scale 11 in the slide 2 through its bushing 7 until the attachments 31 are in engagement with the sockets 21 and 22 and the level 20 indicates that the longitudinal scale 1 is horizontal. The readings of the lateral scale 11 in the slide 2, and of the slide 3 upon the longitudinal scale 1, then give the dimensions $b$ and $a$ respectively. Other means however may be substituted to eliminate the use of the spirit level 20 if desired.

For instance, as shown in Figure 8, if a working surface 40 extends beneath the longitudinal scale 1 blocks 41 of suitable height may be inserted between the said scale and this surface to insure that the former lies in the desired plane. In this case the device is used to measure the vertical and horizontal distances between th centers of two partly spherical elements 23 and 24. One attachment 30 shown in Figure 3 is mounted upon the threaded extremity 14 of one lateral scale 11, and upon the extremity 14 of the other lateral scale an attachment 32 shown in Figure 5 is utilized. If when the attachment 32 is screwed upon its scale 11 it is found that it is so turned that it will not seat upon the partly spherical element 24 the scale 11 and its bushing 7 may be rotated in the slide 3 to obtain proper seating. The readings in this are obtained in a manner exactly similar to that described in connection with Figure 7.

In Figure 9 the direct distance between the centers of two sockets 25 and 26 is being measured by the use of spherical attachments 33, shown in Figure 6 upon the threaded ends 14 of the lateral scales 11. The slide 2 is set at zero upon the scale 1, and both the lateral scales 11 are also set at zero in their bushings 7. The reading of the vernier on the slide 3 which cooperates with the graduations on the longitudinal scale 1 then is the distance between the centers of the sockets 25 and 26.

While in the foregoing the preferred embodiment of the invention has been described and shown it is understood that alterations and modifications may be made thereto which fall within the scope of the claims and it is also understood that a wide range of different attachments may be used upon the threaded ends of the lateral scales to suit the parts between which measurements are to be taken.

What I claim is:

1. A measuring device comprising a longitudinal graduated scale, a slide thereon, a second slide mounted for longitudinal movement thereon in alignment with the first named slide, and having graduations thereon to register with the graduations upon the longitudinal scale, a circular bushing extending transversely through each slide and mounted for rotation therein, said bushings being in alignment with one another, and a lateral scale mounted for axial movement through each bushing whereby each bushing and its lateral scale may be rotated together in their guide, each bushing and its lateral scale having registering graduations thereon.

2. A measuring device comprising the combination set forth in claim 1, wherein the bore of the bushings and the lateral scales are circular in cross section, and means coacting with each bushing holding its lateral scale against rotary movement, said means being adapted to hold each lateral scale immovable in its bushing.

3. A measuring device comprising a longitudinal graduated scale, slides mounted for movement therealong in alignment with one another, said slides having graduations thereon to register with the graduations on the longitudinal scale, means on each slide for holding it immovable on the longitudinal scale, a bushing mounted for rotation in each slide and extending at right angles to the longitudinal scale, said bushings being in alignment with one another, a lateral scale mounted for axial movement through each bushing and having graduations thereon to register with graduations upon the bushing, means for holding each lateral scale immovable in its bushing, and means on one extremity of each lateral scale adapted to receive a measuring attachment.

4. A measuring device comprising a circular graduated scale having a longitudinal keyway formed therein, slides mounted thereon having keys therein for sliding movement in the keyways, each slide having graduations thereon to register with the scale graduations, means for holding each slide immovable on the scale, a tubular bushing mounted for rotation in each slide about an axis at right angles to the axis of the scale, said bushings being in alignment with one another, a circular lateral scale mounted in each bushing for axial movement therethrough, means preventing rotary movement of each lateral scale in its bushing, said means being adapted to hold its lateral scale immovable in its bushing, said lateral scales and their bushings having registering graduations thereon, and means on one extremity of each lateral scale adapted to receive a measuring attachment.

5. A measuring device comprising the combination set forth in claim 4 wherein each bushing has a sleeve extending from one extremity which is apertured, and the graduations on the bushings are carried by the sleeves to register with some of the lateral scale graduations visible through apertures.

WALTER WOGECK.